United States Patent [19]
Kazemzadeh

[11] Patent Number: 5,750,173
[45] Date of Patent: May 12, 1998

[54] METHOD OF MANUFACTURING SYRUP-INFUSED FOOD PIECES

[75] Inventor: Massoud Kazemzadeh, Bloomington, Minn.

[73] Assignee: MJM Technologies, L.L.P., Stacy, Minn.

[21] Appl. No.: 743,207

[22] Filed: Nov. 5, 1996

[51] Int. Cl.$^6$ ........................................... A23L 1/00
[52] U.S. Cl. ........................................... 426/516; 426/302
[58] Field of Search ........................... 426/302, 305, 426/103, 516

[56] References Cited

U.S. PATENT DOCUMENTS

| | | | |
|---|---|---|---|
| 3,557,718 | 1/1971 | Chivers | 426/290 |
| 3,615,647 | 10/1971 | Kassens | 426/305 |
| 3,615,655 | 10/1971 | Freeman | 426/417 |
| 3,615,676 | 10/1971 | McKowe | 426/293 |
| 3,723,131 | 3/1973 | Bixby et al. | 426/302 |
| 3,764,715 | 10/1973 | Henthorn et al. | 426/273 |
| 3,814,822 | 6/1974 | Henthorn et al. | 426/293 |
| 3,873,748 | 3/1975 | Schwab et al. | 426/446 |
| 3,955,000 | 5/1976 | Baggerly | 426/96 |
| 3,959,498 | 5/1976 | Lyall et al. | 426/93 |
| 3,976,793 | 8/1976 | Olson et al. | 426/96 |
| 4,038,427 | 7/1977 | Martin | 426/285 |
| 4,044,159 | 8/1977 | Lutz | 426/302 |
| 4,061,790 | 12/1977 | Cole, Jr. | 426/303 |
| 4,079,151 | 3/1978 | Schade et al. | 426/96 |
| 4,089,984 | 5/1978 | Gilbertson | 426/293 |
| 4,097,613 | 6/1978 | DeLauder et al. | 426/303 |
| 4,101,680 | 7/1978 | Edwards | 426/96 |
| 4,338,339 | 7/1982 | Edwards | 426/96 |
| 4,379,171 | 4/1983 | Furda et al. | 426/291 |
| 4,409,250 | 10/1983 | Van Hulle et al. | 426/242 |
| 4,501,759 | 2/1985 | Gajewski | 426/96 |
| 4,540,587 | 9/1985 | Gajewski | 426/96 |
| 4,702,925 | 10/1987 | Verrico | 426/96 |
| 4,755,390 | 7/1988 | Calandro et al. | 426/293 |
| 4,853,235 | 8/1989 | Tomomatsu | 426/93 |
| 4,880,645 | 11/1989 | Carpenter et al. | 426/89 |
| 4,961,943 | 10/1990 | Blanthorn et al. | 426/102 |
| 5,186,970 | 2/1993 | Ogiwara et al. | 426/516 |
| 5,188,860 | 2/1993 | Hemann et al. | 426/560 |
| 5,372,826 | 12/1994 | Holtz et al. | 426/93 |
| 5,527,553 | 6/1996 | Kazemzadeh | 426/302 |

*Primary Examiner*—George Yeung
*Attorney, Agent, or Firm*—Merchant, Gould, Smith, Edell, Welter & Schmidt, P.A.

[57] ABSTRACT

Described is a process for manufacturing syrup-infused proteinaceous and farinaceous food products by adding syrups heated to various temperatures to extruded food compositions where the extrudate exits the die under pressure, expands and releases moisture upon expansion, thus cooling and setting the structural matrix of the food while replacing the moisture partially or fully with the syrup.

14 Claims, 2 Drawing Sheets

METHOD OF MANUFACTURING SYRUP-INFUSED FOOD PIECES

FIELD OF THE INVENTION

The present invention is related to a process for preparing a food product which has been infused with a syrup employing a post-extrusion process.

BACKGROUND OF THE INVENTION

Use of various syrups for the surface application of cereals and food products is very common. The foods and feeds market utilize a finished extruded food product after high temperature cooking, some drying and/or toasting, followed by the application of the syrup and, in some cases, some solids such as sugar crystals and powders as well as a wide variety of other particulates, in order to impart a given appearance and color to the foods. The steps are additional and cumbersome, due to the stickiness of the product after the application of the syrup, and the exact nature of the application of the powder to the surface in order to increase the solid content on the surface. Both of these steps become even more complex when the drying and handling of the excess powder come into play. An extensive array of cleaning apparati are usually engaged in the coating of sugar slurry onto the surface of the products, and at times the use of a second complete system is necessary in order to clean the back up system while the second system is on-line. This is very cumbersome and costly, both from an investment point of view, as well as from the labor and space point of view.

Most importantly, with the commonly used process, the product is extruded and the matrix is cooled and set after the die, and all the syrup applied can only be added to the surface of the product, with a very small amount being infiltrated into the particulate of expanded foods. This is especially true for all cereals with a closed surface cell structure which does not allow the syrup to infiltrate into the extrudate.

SUMMARY OF THE INVENTION

The present invention relates to a process of replacing the steam vapors within an extrudate with a syrup at the outside of the die area under elevated temperatures which can fulfill the ingredient requirements in a proteinaceous or farinaceous food product whereby the syrup not only coats the surface but more importantly infiltrates the extrudate.

Accordingly, the present invention is a method of manufacturing syrup-infused food products which comprises:

(a) extruding a food composition to form an extrudate and water vapors exiting through a die area with cutting means;

(b) simultaneously venting off the water vapors and introducing the cut extrudate into a heated syrup medium, within or slightly removed from the die area, wherein the extrudate is syrup-infused and then separated by transport means from the syrup medium.

The under-syrup cutting device provides a means by which the extrudate enters the chamber with high solid or low solid syrup, with various flavorings, and at various temperatures. This allows the extrudate to expand and release its moisture while expanding, and at the same time absorb high or low quantities of the syrup into its matrix and allow the matrix to set and solidify in conjunction with the syrup. The temperature of the syrup determines in most cases how far the absorption of the syrup should go. The hotter the syrup, the more absorption takes place. This is due to thermal energy present within the syrup which drives the evaporation of the moisture within the farinaceous or proteinaceous extrudate further, resulting in a drier and more crisp product at the end of the process. The crispness of the product has been demonstrated to be directly proportional to the solids present within the syrup and the amount of drying that takes place within the expanding zone of the die and syrup, thus resulting in absorption and replacement of the moisture with the syrup. Most cooking extruders operate with die temperatures of 300° F. or more, which tends to cause the extrudate temperature to be even higher. This limits the types of vitamins and colorants, as well as some of the flavorings, which are not heat stable (at temperatures of over 200° F.) to be used inside the extruder as part of the initial formula, unless they are over-portioned or protected by encapsulation or chemically protected to prevent them from a degradation or shifting in taste and chemical formulation. These additives are usually much higher in cost than those purchased for applications with lower temperature profile systems, such as baking.

An alternative embodiment of the present invention provides for the die area to be slightly removed from the surface of the syrup and highly ventilated by additional application of a light vacuum. This allows the extrudate to be expanded and release most of its vapor before it is further driven by the hot syrup. This technique of use of under-syrup extrusion allows the moisture to be easily removed without diluting or being incorporated into the syrup mixture.

The desired expanded, i.e., syrup enriched, dried product is especially useful, for example, in the cereal industry. The main features of the present invention are (1) the design of a cutter in or near a chamber and the mechanism by which the extrudate is introduced into a chamber filled with a medium that is temperature-controlled to provide a specific expansion ratio and simultaneously cut with a rotary type knife cutter in order to heat the extrudate; (2) that the chamber is filled with a heated syrup medium (such as water soluble polymers, biopolymers, sugars, and using the temperature of the medium to cool or heat the extrudate further after exiting the die area; (3) that there is a cutting mechanism by which the extrudate is cut and separated from the die assembly; (4) that the cut extrudate is transported away from the die by the moving or pumping action of the medium, and (5) that the medium is then separated from the extrudate and whereby the syrup medium is removed by draining away the excess from the cut product and recycling the syrup medium back into the heating or cooling area, in which it is replenished from a reservoir and brought to the desirable temperature and pumped back into the chamber by or near the die and the cutter area.

DETAILED DESCRIPTION OF THE PREFERRED EMBODIMENT

Figure 1:
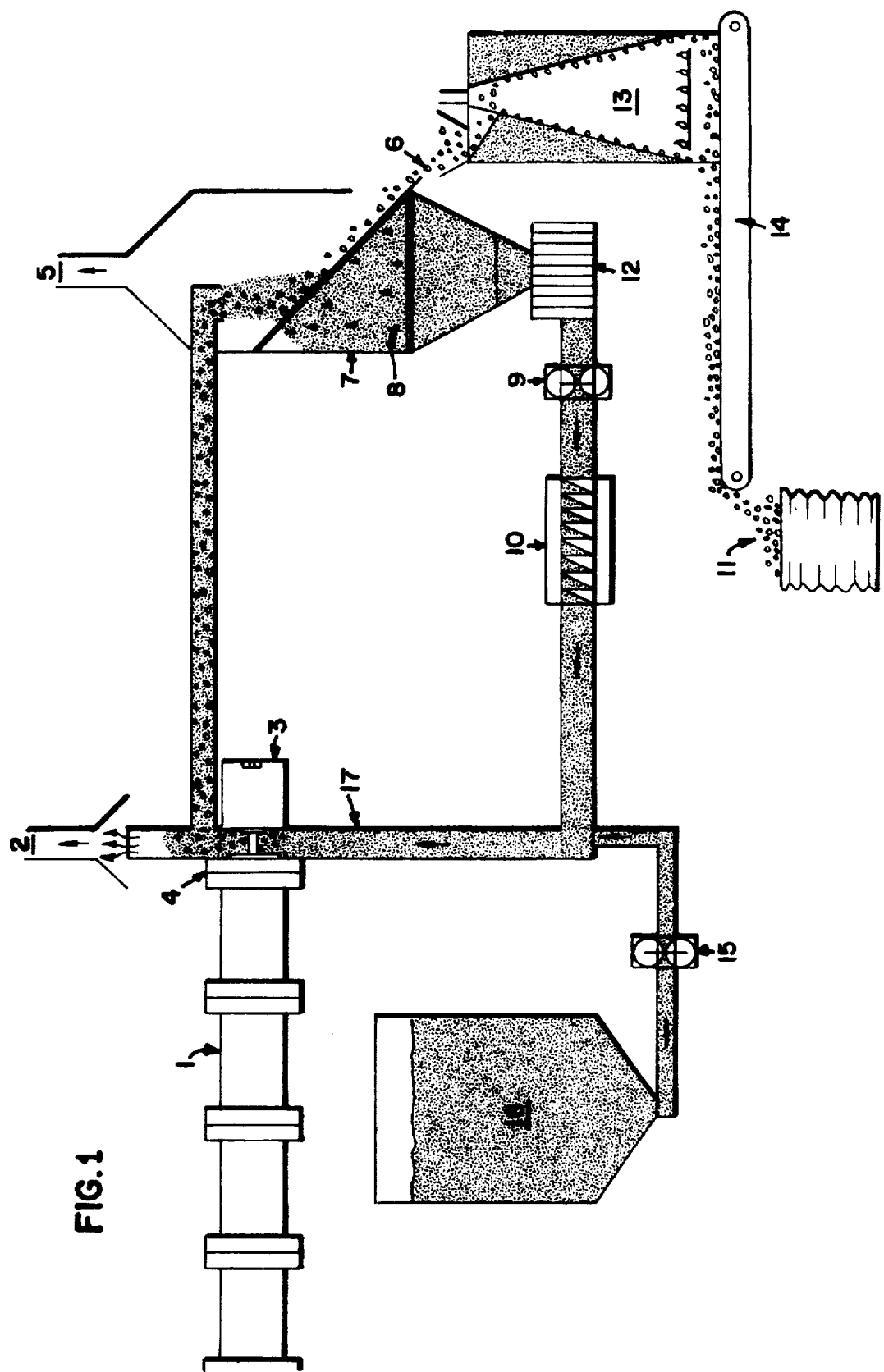
FIG. 1 is a representation of the process of the present invention showing an extruder connected at the die area with the chamber containing the syrup medium, venting means, cutting means and transport means to complete the finishing process for the syrup-infused food product manufacture.

By referring to FIG. 1, the present process is carried out by first adding a food composition, such as a proteinaceous or farinaceous composition, which comprises known ingredients such as, for example, proteins, sugars, starches, hydrocolloids, fats including polymeric derivatives thereof, whole grains, vitamins, minerals, and the like into a hopper (not shown); the hopper feeds the raw material into a cooking or heating extruder, for example, a Buhler cooker extruder 1 wherein the materials are subjected to temperatures and pressures, e.g. 120°–380° F. and 150–1300 psi. The temperature of the extrudate will not necessarily match the extruder die area temperature due to heat, shear history during extrusion. The extrudate may expand in two directions; (1) longitudinally, where the extrudate expands within the die area in the direction of extrusion, and/or; (2) radially, where the extrudate expands in the direction perpendicular in the line of extrusion. As a preferred embodiment, a die design where the longitudinal expansion is kept to a minimum may be used. Under either of the extreme conditions, the extrudate temperature will depend on the temperature history and the extent of shear produced by mechanical energy during extrusion. Therefore, the expansion ratio of the extrudate at the cutting area will depend on the change in temperature, delta t, between the extrudate and the heated syrup medium. The resulting extrudate is then introduced into a heated syrup medium directly at the die in an under-syrup housing apparatus 17. The heated syrup is pumped into the under-syrup housing apparatus 17 from syrup reservoir 16 through syrup pump 15 or after operation has begun from the recovery system described below employing pumping system 9 and heating system 16 located in housing apparatus 17. The temperature of the syrup can be controlled to further heat the extrudate, if desired, thus infusing more of the syrup into the extrudate during the cutting and transport steps described later. The temperature of the syrup may vary from 70°–202° F. under normal moisture conditions. When desired with moisture content of less than 3%, the syrup medium may be super-heated above 202° F. to about 265° F. The temperature level depends on the amount of syrup to be infused in the medium and is a function of the desired specifications of the food product to be manufactured in a particular batch process step.

Addition of gases into the extruder, which, for example, may be used during lower temperature extrusions of 250° F. or less at the die, will increase the expansion of the extrudate and will allow for an increase in the absorption of the syrup with respect to extrudate made without the gas injection into the extruder. Gases, such as carbon dioxide, oxygen, helium and other inert gases, may be added by injection at any convenient location in the extruder.

The extrudate is simultaneously cut by a cutting apparatus 3 shown as cutting knives located inside of the under-syrup housing apparatus 17, and the extrudate is freely transported by the medium out of the area once it has been cut and detached from the die face. The process can be considered as part of the cutting mechanism of the extruder (single screw, twin screw or multi-screw extruder).

During the extrusion, cutting and immersion into the syrup medium, water vapors (steam) generated by the extrudate are vented off through venting hood 2.

Following the venting of the steam and infusion by the heated syrup medium the cut extrudate is then transported to a draining and filtering apparatus 7 by which the excess syrup is separated from the cut extrudate. A venting hood 5 is placed above the filtering operation to remove any excess steam. At this point, the cut and infused extrudate 6 is rolled down to a dryer 13 then onto a conveyor belt 14 to the packaging area 11. As the cut and infused extrudate 6 is separated from the syrup medium, the excess syrup droplets 8 are filtered through filter system 12, pumped back into the housing apparatus by pumping system 9, heated by going through heating system 10 and reused in the operation.

During actual trials of the above described process, the solid contents of the syrup could not be increased beyond 92% without the appearance of crystalline sugar on the bottom of the syrup pan; therefore, the highest temperature achieved was approximately 202° F. The process was designed in a fashion such that the extrudate was expanded with hot syrup being pumped into the die area during the cutting and extrusion. It was calculated that the process can cause absorption of up to 55% in syrup or more, depending on the extrudate formulation. It was also noted that the textural profile of the finished product, when tested by a panel of tasters, was reported as being highly sweet-filled on the inside, with syrup and a very unusual texture of a delicate crunch. This definition of delicate crunch is common to almost all of the products produced under this process, with the crumb texture when examined under the microscope being very different than what is experienced for products produced in a traditional manner.

The above-described process as illustrated by FIG. 1 describes one form or design of under-syrup cutting which can be adapted to any extrusion system that uses high pressure and/or high temperature at the die during its process. This includes fully expanded particulate all the way to slightly swelled products.

The process of the invention tends to add a very special pattern of texture to the food product, which cannot be achieved by former known methods. The special crumb texture developed in the present process is believed to be directly related to the osmotic pressure which is inherent to the syrup surrounding the extrudate, internal forces present in high solid syrups, and the effect of moisture which remains within the crumb structure. The present process also allows for the introduction of a wide variety of food additives, such as, for example, flavoring and coloring agents especially natural coloring agents which are heat unstable, as well as a variety of tastes, proteins and vitamins, to the extrudate at lower temperatures where the colorants and flavors are stable and are not subject to degradation, change or shift in nature. The above food additives and other known food additives are not only deposited on the surface of the extrudate but are also infused with the syrup into the extrudate.

The present invention may be carried out by an alternative process embodiment where the die area is slightly removed from the surface of the syrup medium and is highly ventilated. Thus, by referring to FIG. 2, the present process may be carried out by passing the proteinaceous or farinaceous food composition through an extruder 21 subjected to temperatures and pressures of about 120°–380° F. and 150–1300 psi. In this case, the die is a goose neck die 24 attached to the extruder. At the exit of the die is attached the die cutting mechanism 22 and over the die area is a venting hood 23. Connected to the die and the die cutting mechanism and extending below the surface of the syrup medium 36 is a vacuum chamber 25 connected to a vacuum pump 34 or venting fan 34. This allows evacuation of the water vapors (steam) coming out of the die as the extrudate goes through the die and is being cut. A light vacuum is applied creating a negative pressure in the vacuum chamber of about 0.1 to about 15 mm Hg. Thus, the extrudate is cut, water vapors evacuated and the extrudate dropped into the syrup container apparatus 26 containing the syrup medium. The amount of vacuum applied under the above conditions will enhance the expansion ratio of the product as well as increase infusion of the syrup. The cut extrudate is then transported by a conveyor belt 35 above the syrup medium onto a dryer/stabilizer belt 27. The particles, i.e. cut extrudate, then fall into a fluid bed dryer/cooler system 28 transporting the finished product to being packaged 33.

The syrup medium is initially stored in syrup reservoir 29 with heating jacket 37. The syrup medium is pumped through pump system 30 and through an on-line heating system 32 to the syrup container apparatus 26. The syrup medium is thus continuously reused as it is pumped through apparatus 26 then out and through a filtering system 31 and back through the on-line heating system 32 and back into the syrup container apparatus 26 as well as being replenished on a continuous basis controlled by level indicators 38 and 39 within the syrup container apparatus.

The syrup medium used in the present invention may be made up of various mixtures of sugars, polymers and/or biopolymers which are water soluble, or dispersions of protein, encapsulated protein or mixtures thereof including various ingredients, such as food additives mentioned above, suspended or in an emulsion within the liquid mixture. The entire syrup medium including the food additives are infused into the extrudate and cover the extrudate with a layer of the syrup or polymer. Since the water soluble syrup inevitably will absorb some of the moisture given off by the extrudate at the die area, the moisture must be driven off by a high boil-off reservoir so that the solid content of the syrup is maintained within the system. For example, cereals and starch-based sweet snacks must be dried to 2% or less moisture in order to maintain a given textural integrity. The present process will allow the extrudate to contain more than 6% moisture within the extrudate piece and yet remain stable under all types of packaging. This is specifically due to the water activity, which is very low for syrups with 85% solids or higher. Further, moisture trapped within the matrix is sterile and will not render itself to conditions which will allow growth of molds, bacteria or yeast.

The present process also lends itself well to the manufacturing of human snacks and cereals, as well as pet treats and feeds with special vitamin or water soluble ingredient requirements. For pet treat processing, the syrup slurry can be made up of water slurry containing some sugars, some encapsulated ingredients in suspension, and other ingredients, or an emulsion of water and oil or water soluble and non-water soluble components which, when dried on the surface of the pellet, i.e., cut extrudate, will give rise to a product with full flavoring on the surface of the pellet as well as inside of the pellet matrix.

Figure 2:
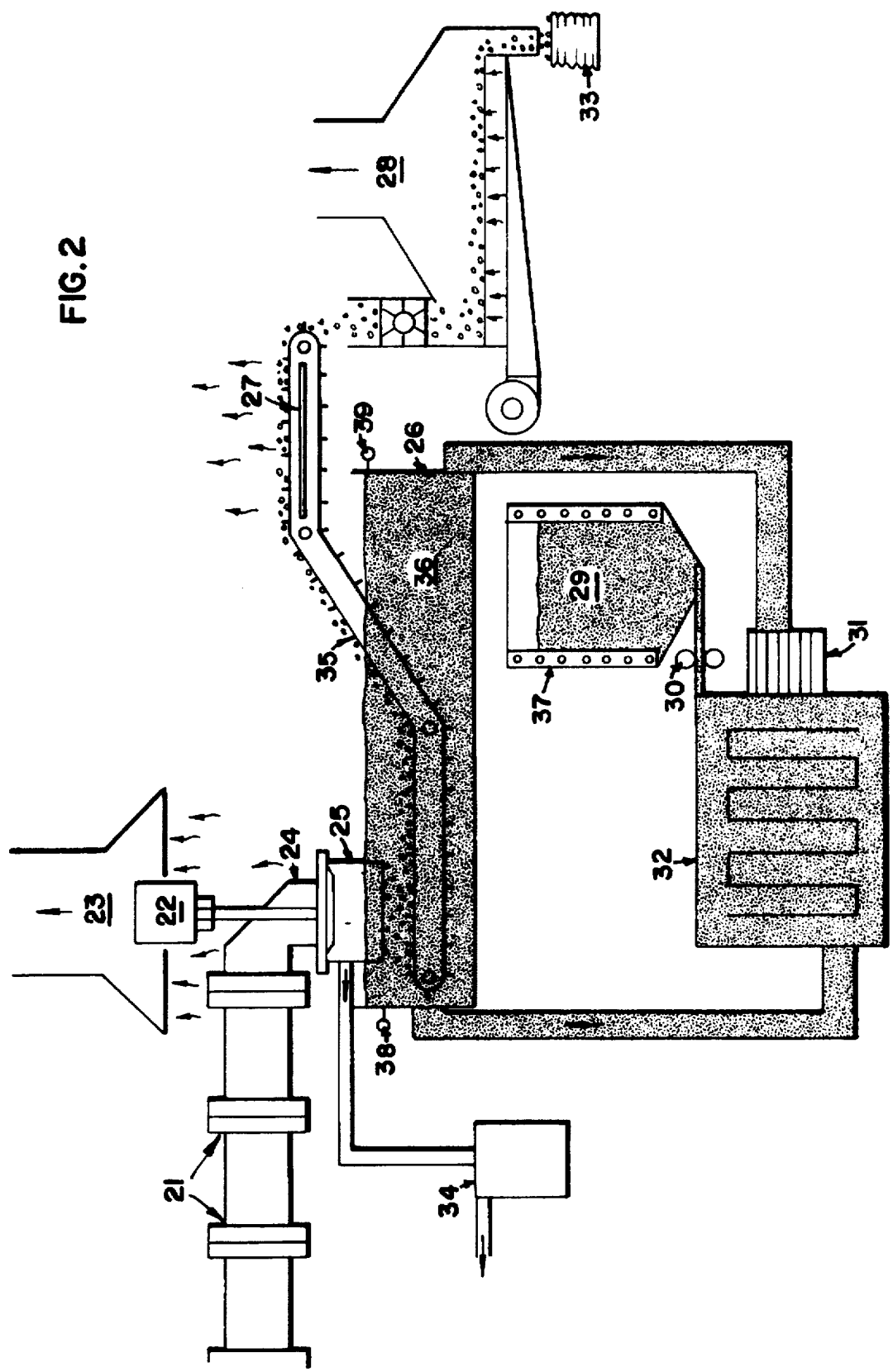
FIG. 2 is a representation of an alternative embodiment of the process of the present invention showing an extruder connected at the die area slightly removed from the surface of the syrup medium in the chamber, cutting means in the die area, a vacuum system to evacuate the steam and transport means below the chamber to complete the finishing process for the syrup-infused food product manufacture.

FIGS. 1 and 2 illustrate two methods for introduction of syrup made up of water soluble polymers and biopolymers, such as a variety of sugars and polymerized starches or any type of medium, to the die area of the extruder. There are a number of other methods to achieve the same result. This may include the design created for the under-oil cutting process described in U.S. Pat. No. 5,527,553 or any modification of that design. Whatever the design may be, it must accommodate an area whereby the moisture being given off from the die head area of the extruder can be evacuated so that steam pressure will not build up to damage the system, nor will there be moisture accumulated to contaminate or mix with the syrup, thereby reducing its solid concentration.

The above specification and drawings provide a complete description of the manufacture and use of the composition of the invention. Since many embodiments of the invention can be made without departing from the spirit and scope of the invention, the invention resides in the claims hereinafter appended.

I claim:

1. A method of manufacturing syrup-infused food pieces which comprises:

(a) extruding a food composition to form an extrudate and water vapors exiting through a die area with cutting means;

(b) simultaneously venting off the water vapors and cutting the extrudate into food pieces by the cutting means into a heated syrup medium placed in a container, thereby infusing the syrup medium into the food pieces;

(c) separating the syrup-infused food pieces from the syrup medium by transport means; and (d) removing the syrup medium from the container.

2. The method of claim 1, wherein the food composition is proteinaceous or farinaceous.

3. The method of claim 1, wherein the cutting of the extrudate takes place within the syrup medium.

4. The method of claim 3, wherein the water vapors are vented off by means of a hood.

5. The method of claim 1, wherein the cutting of the extrudate takes place above the syrup medium.

6. The method of claim 5, wherein the water vapors are vented off by a vacuum chamber containing the cut extrudate and syrup medium.

7. The method of claim 6, wherein the vacuum chamber is kept at a negative pressure of about 0.1 to about 15 mm Hg.

8. The method of claim 1 wherein the food composition is extruded at a temperature between about 120°–380° F. and a pressure between about 150–3000 psi.

9. The method of claim 1 wherein a gas is injected in an extruder to assist extruding the food composition.

10. The method of claim 1 wherein the syrup medium is at a temperature between about 70°–202° F.

11. The method of claim 1 wherein the syrup medium is super-heated above 202° F.

12. The method of claim 1 wherein the syrup medium comprises water soluble polymers, biopolymers, sugars; dispersions or emulsions of proteins, encapsulated proteins and food additives, and mixtures thereof.

13. The method of claim 12 wherein the food additives are selected from the group consisting of colorings, flavorings, vitamins and mixtures thereof.

14. The method of claim 1 wherein the removed syrup medium is filtered and recycled into the container.

* * * * *